(12) United States Patent
Seki et al.

(10) Patent No.: US 8,218,891 B2
(45) Date of Patent: Jul. 10, 2012

(54) FILTERING CIRCUIT, FILTER PROCESSING METHOD, IMAGE PICKUP ELEMENT CIRCUIT AND CAMERA

(75) Inventors: Takeshi Seki, Kasugai (JP); Yuri Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 962 days.

(21) Appl. No.: 12/234,662

(22) Filed: Sep. 21, 2008

(65) Prior Publication Data

US 2009/0087117 A1 Apr. 2, 2009

(30) Foreign Application Priority Data

Sep. 28, 2007 (JP) ................. 2007-252898

(51) Int. Cl.
*G06K 9/36* (2006.01)
(52) U.S. Cl. ....... 382/260; 382/274; 382/275; 358/3.26; 358/3.27
(58) Field of Classification Search ................. 382/260, 382/274, 275; 358/3.26, 3.27, 463
See application file for complete search history.

(56) References Cited

U.S. PATENT DOCUMENTS

| 6,734,896 B2* | 5/2004 | Nobori et al. ........... 348/148 |
| 7,488,237 B2* | 2/2009 | Saitoh ............... 451/44 |
| 7,626,585 B2* | 12/2009 | Kondo et al. ........... 345/426 |
| 7,688,368 B2* | 3/2010 | Kijima et al. ........... 348/272 |
| 7,714,887 B2* | 5/2010 | Nobori et al. ........... 348/148 |
| 7,746,470 B2* | 6/2010 | Engelhardt ........... 356/365 |
| 7,769,230 B2* | 8/2010 | Pillman et al. ........... 382/167 |
| 2006/0222259 A1 | 10/2006 | Obara |

FOREIGN PATENT DOCUMENTS

| JP | 63-091783 | 4/1988 |
| JP | 01-116887 | 5/1989 |
| JP | 2006-238060 | 9/2006 |
| JP | 2006-279709 A | 10/2006 |

OTHER PUBLICATIONS

"Japanese Office Action" mailed by JPO and corresponding to Japanese application No. 2007-252898 on Aug. 30, 2011, with partial English translation.
Japanese Office Action mailed Jan. 10, 2012 for corresponding Japanese Application No. 2007-252898, with English-language translation.

* cited by examiner

*Primary Examiner* — Yosef Kassa
(74) *Attorney, Agent, or Firm* — Fujitsu Patent Center (57) ABSTRACT

A filtering circuit which filters an image picked up by an image pickup element arranged in a two dimensional array. The filtering circuit includes a plurality of filtering units and a selecting unit. The plurality of filtering units locally filter a plurality of pixels forming the image, and the selecting unit selects one or more pixels to be filtered by one of the filtering units and selects another pixel to be filtered by another one of filtering units. The selected one or more pixels filtered by the one filtering unit and the selected another pixel filtered by another one of the filtering units belong to a same column in the two dimensional array.

17 Claims, 9 Drawing Sheets

| (2,2) | | (2,1) | | (2,0) | | (2,-1) | | (2,-2) |
|---|---|---|---|---|---|---|---|---|
| | | | | | | | | |
| (1,2) | | (1,1) | | (1,0) | | (1,-1) | | (1,-2) |
| | | | | | | | | |
| (0,2) | (0,1) | | (0,0) | | (0,-1) | | (0,-2) | |
| | | | | | | | | |
| (-1,2) | | (-1,1) | | (-1,0) | | (-1,-1) | | (-1,-2) |
| | | | | | | | | |
| (-2,2) | | (-2,1) | | (-2,0) | | (-2,-1) | | (-2,-2) |

MAT

FIG. 6

MAT

| GR7 (-2,2) | | GR8 (-1,2) | | GR5 (0,2) | | GR3 (1,2) | | GR2 (2,2) |
|---|---|---|---|---|---|---|---|---|
| | | | | | | | | |
| GR3 (-2,1) | | GR2 (-1,1) | | GR1 (0,1) | | GR4 (1,1) | | GR7 (2,1) |
| | | | | | | | | |
| GR4 (-2,0) | | GR6 (-1,0) | | GR8 (0,0) | | GR1 (1,0) | | GR5 (2,0) |
| | | | | | | | | |
| GR8 (-2,-1) | | GR1 (-1,-1) | | GR4 (0,-1) | | GR2 (1,-1) | | GR6 (2,-1) |
| | | | | | | | | |
| GR5 (-2,-2) | | GR7 (-1,-2) | | GR3 (0,-2) | | GR6 (1,-2) | | GR8 (2,-2) |

FIG. 7

| | | | | | | | | | |
|---|---|---|---|---|---|---|---|---|---|
| GR7 (-2,2) | | GR3 (-2,1) | | GR4 (-2,0) | | GR8 (-2,-1) | | GR5 (-2,-2) | |
| | | | | | | | | | |
| GR8 (-1,2) | | GR2 (-1,1) | | GR6 (-1,0) | | GR1 (-1,-1) | | GR7 (-1,-2) | |
| | | | | | | | | | |
| GR5 (0,2) | | GR1 (0,1) | | GR8 (0,0) | | GR4 (0,-1) | | GR3 (0,-2) | |
| | | | | | | | | | |
| GR3 (1,2) | | GR4 (1,1) | | GR1 (1,0) | | GR2 (1,-1) | | GR6 (1,-2) | |
| | | | | | | | | | |
| GR2 (2,2) | | GR7 (2,1) | | GR5 (2,0) | | GR6 (2,-1) | | GR8 (2,-2) | |

MAT, A1, A2

FIG. 9

MAT

|     | (2,2) |  | (2,1) |  | (2,0) |  | (2,-1) |  | (2,-2) |
|-----|-------|--|-------|--|-------|--|--------|--|--------|
|     |       |  |       |  |       |  |        |  |        |
|     | (1,2) |  | (1,1) |  | (1,0) |  | (1,-1) |  | (1,-2) |
|     |       |  |       |  |       |  |        |  |        |
|     | (0,2) |  | (0,1) |  | (0,0) |  | (0,-1) |  | (0,-2) |
|     |       |  |       |  |       |  |        |  |        |
|     | (-1,2)|  | (-1,1)|  | (-1,0)|  | (-1,-1)|  | (-1,-2)|
|     |       |  |       |  |       |  |        |  |        |
|     | (-2,2)|  | (-2,1)|  | (-2,0)|  | (-2,-1)|  | (-2,-2)|

FILTERING CIRCUIT, FILTER PROCESSING METHOD, IMAGE PICKUP ELEMENT CIRCUIT AND CAMERA

CROSS-REFERENCE TO RELATED APPLICATIONS

This application claims the benefit of priority from Japanese Patent Application No. 2007-252898 filed on Sep. 28, 2007, the entire contents of which are incorporated herein by reference.

BACKGROUND

1. Field

Example embodiments discussed herein are directed to image processing of image data. The example embodiments may relate to noise removal processing for the image data.

2. Description of the Related Art

Japanese Patent Laid-Open Publication No. 1988-91783 discloses a smoothing technique for removing noise in image data so as to clearly display a boundary surface of the image. Japanese Patent Laid-Open Publication No. 2006-279709 discloses an information processing apparatus for removing the noise in the image data with a smoothing operation.

In some cases, a plurality of pixels forming an image picked up by an image pickup element includes continuous noise pixels. The following are typical examples of the above-described continuous noise pixels. The plurality of noise pixels are pixels in a line in a vertical scanning direction or form a block of continuous noise pixels in both lateral and longitudinal directions, for example. Continuous noise pixels affect an image resulting from reproduction. For example, the continuous noise pixels generally have a detrimental affect on image quality. However, it has been difficult to remove the continuous noise pixels with the conventional smoothing operations.

The continuous noise pixels are caused when defective pixels are found in the image pickup element or when the images are picked up with high-sensitivity. The noise due to such defective pixels, or due to an image pickup operation with high-sensitivity, is impulsive noise. The rate of occurrence of the impulsive noise does not follow Gaussian distribution, and the amplitude of the impulsive noise is irregular. Impulsive noise affects the output image. However, it has been difficult to sufficiently remove such impulsive noise with the conventional smoothing operations.

SUMMARY

Embodiments of the invention provide methods, circuits and apparatuses for removing continuous noise pixels and may increase the quality of an output image. Example embodiments also provide a method and apparatus for reducing and/or eliminating impulsive noise within an output image.

An embodiment of the invention provides a filtering circuit which filters an image picked up by an image pickup element arranged in a two dimensional array. The filtering circuit includes a plurality of filtering units and a selecting unit. The plurality of filtering units locally filter a plurality of pixels forming the image. The selecting unit selects at least one pixel to be filtered by one of the filtering units and selects another pixel to be filtered by another one of filtering units. The selected at least one pixel filtered by the one filtering unit and the selected another pixel filtered by the another filtering unit belong to a same column in the two dimensional array.

Another example embodiment provides a method of filtering an image picked up by an image pickup element arranged in a two dimensional array. The method includes selecting at least one pixel to be filtered by a first filtering unit, selecting another pixel to be filtered by a second filtering unit, and filtering the selected at least one pixel using the first filtering unit. The selected at least one pixel and the selected another pixel belong to a same column in the two dimensional array.

Other features and advantages of embodiments of the invention are apparent from the detailed specification and, thus, are intended to fall within the scope of the appended claims. Further, since numerous modifications and changes will be apparent to those skilled in the art, it is not desired to limit the embodiments of the invention to the exact construction and operation illustrated and described, and accordingly all suitable modifications and equivalents.

DETAILED DESCRIPTION OF EXAMPLE EMBODIMENTS

Figure 1:
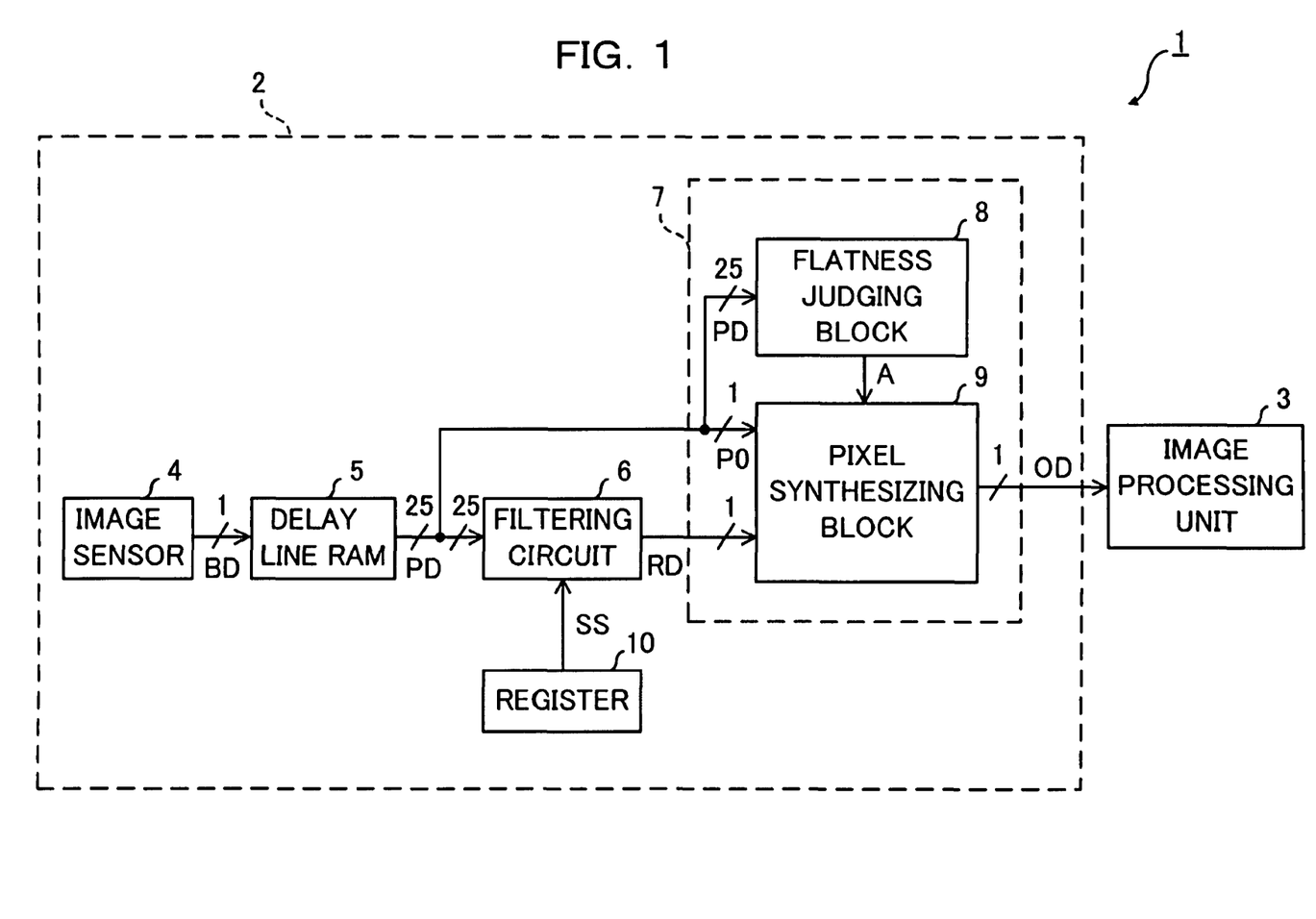
FIG. 1 shows a block diagram of a camera according to an example embodiment of the invention.

Hereinafter, a filtering circuit, a filter processing method, an image pickup element circuit and a camera according to example embodiments of the invention will be described with reference to FIGS. 1 through 8. A first embodiment of the invention will be described with reference to FIGS. 1 through 6. FIG. 1 shows a camera 1 according to the first embodiment of the invention. The camera 1 includes an image pickup element 2 and an image processing unit 3. The image pickup element circuit 2 includes an image sensor 4, a delay line RAM 5, a filtering circuit 6, an image processing circuit 7, and a register 10. In FIG. 1, the image processing circuit 7 includes a flatness judging block 8 and a pixel synthesizing block 9.

The image sensor 4 is a CCD/CMOS sensor with Bayer array. The Bayer array is configured such that each pixel sensor corresponding to each color (i.e., R, Gr, Gb and B) is two-dimensionally arranged in vertical and horizontal scanning directions. An image data BD of the Bayer array supplied from the image sensor 4 is serially input to the delay line RAM 5.

Figure 2:
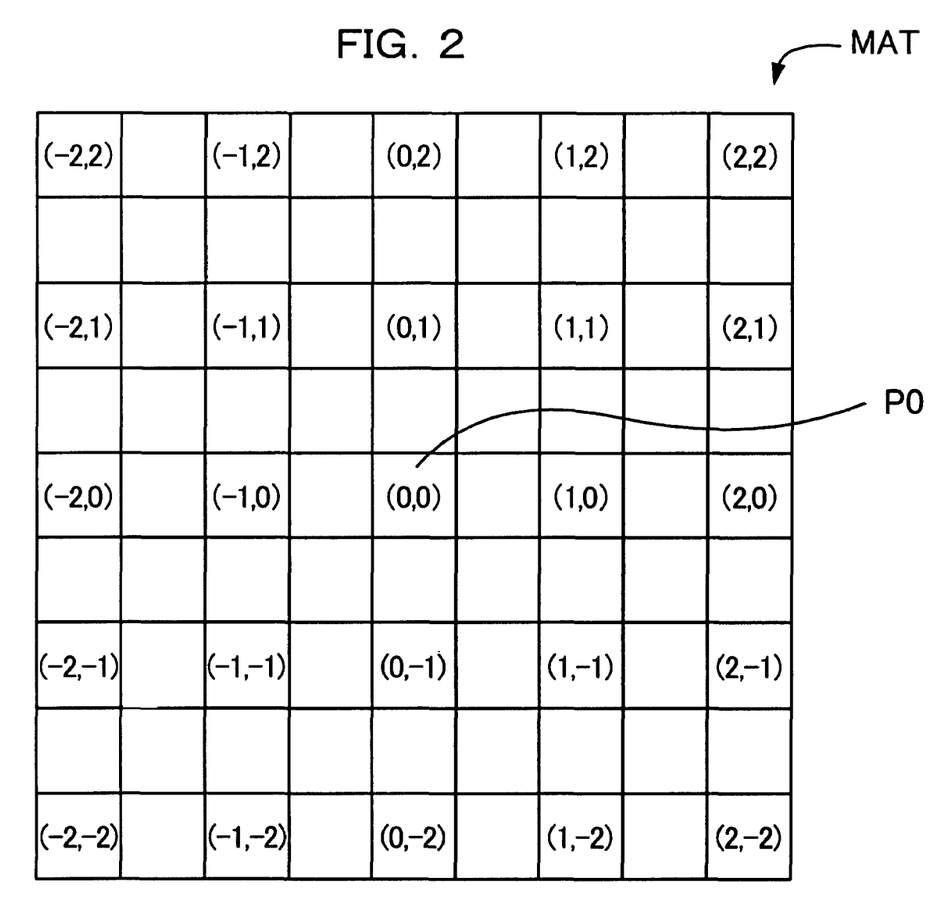
FIG. 2 shows a matrix according to an example embodiment of the invention.

The delay line RAM 5 stores the image data BD in units of certain lines. Noise may be reduced and/or removed in units of lines, for example. In an example embodiment of the invention, the delay line RAM 5 stores the image data BD corresponding to nine lines. As shown in FIG. 2, a matrix MAT in a form of a two-dimensional array of the Bayer array is obtained. As shown in FIG. 2, the delay line RAM 5 extracts pixel data PD of, e.g., five by five pixels (a total of twenty-five pixels). To obtain the pixel data PD, the delay line RAM 5 extracts pixels around a target pixel P0 serving as the center of the twenty-five pixels when the neighboring pixels are extracted. Note that the neighboring pixels in four directions to be extracted have the same color as the target pixel P0. In this case, the four directions include a longitudinal direction, a lateral direction, a right and left oblique directions. The target pixel P0 is situated in a position with coordinates (0,0). Pixels that are adjacent to the target pixel P0 (in this example, pixels from a pixel with coordinates (−2,−2) to a pixel with coordinates (2,2)) are assigned to the pixel data PD. The delay line RAM 5 outputs the pixel data PD (total of twenty-five pixels and having the same color) in parallel and then the pixel data PD is input to the filtering circuit 6 and the image processing circuit 7. In the above-described Bayer array, even if any one of color pixels (that is, R, Gr, Gb and B) is selected as a center pixel, the pixels having the same color as the center pixel alternately appear in the four directions on the matrix MAT.

Hereinafter, the filtering circuit 6 will be described with reference to FIG. 3. The filtering circuit 6 includes a plurality of selector units SL1 through SL8. The filtering circuit 6 also includes a plurality of first filtering units FF1 through FF8 and a second filtering unit SF. A setting signal SS output from the register 10 and the pixel data PD output from the delay line RAM 5 are input to each of the selector units SL1 through SL8.

Figure 4:
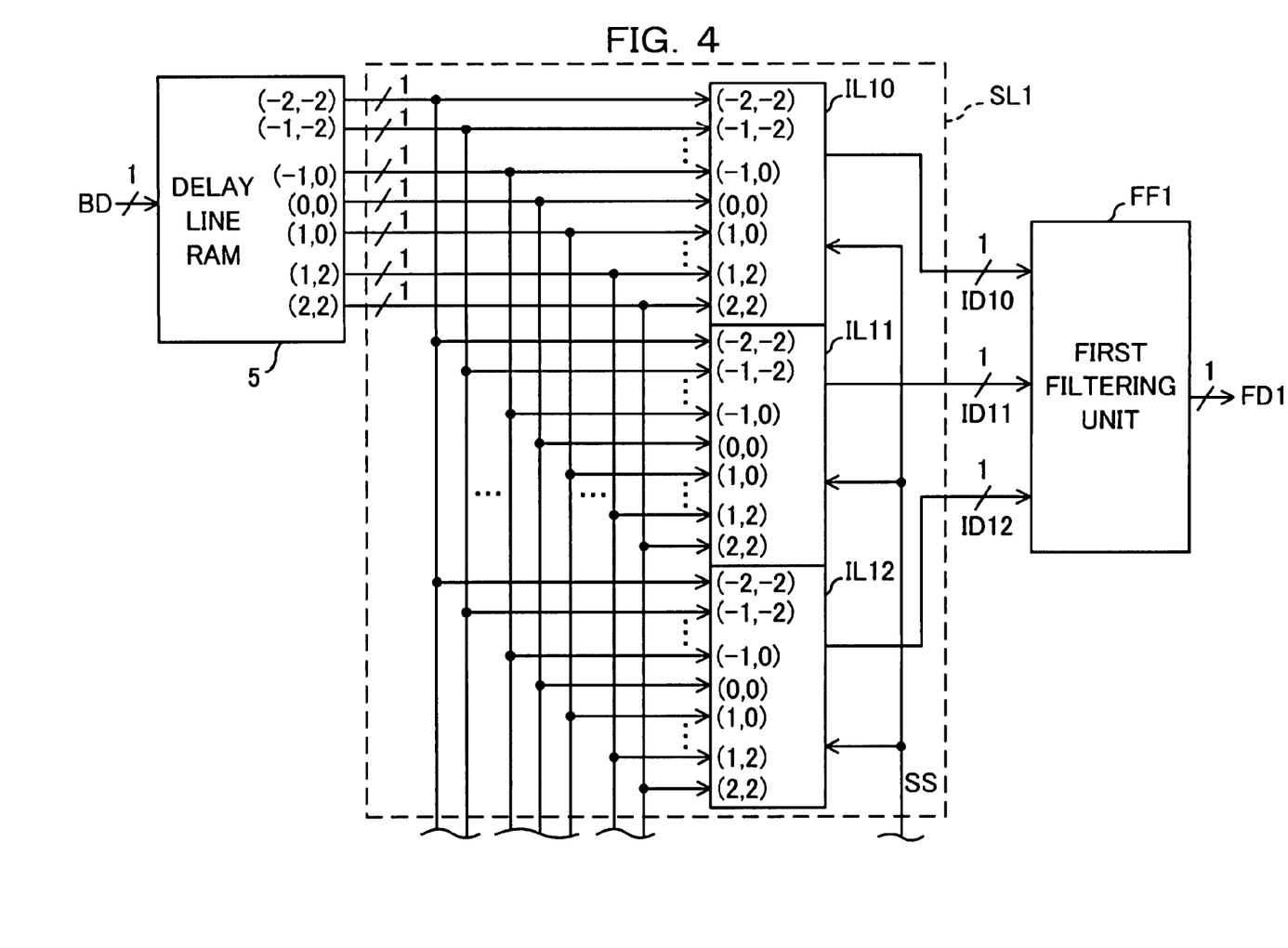
FIG. 4 shows a block diagram of a selector unit according to an example embodiment of the invention.

FIG. 4 shows a detailed circuit diagram of the selector unit SL1. The selector unit SL1 includes three internal selectors IL10 through IL12, each of which corresponds to three inputs of the first filtering unit FF1 in a subsequent stage. The internal selectors IL10 through IL12 have twenty-five inputs and one output in total. The pixel data PD of twenty-five pixels in total (i.e., from the pixel with coordinates (−2,−2) to the pixel with coordinates (2,2)) are input in parallel to the internal selectors IL10 through IL12. In addition, the setting signal SS is input to each of the internal selectors IL10 through IL12. For example, a common setting signal SS is input to each of the internal selectors IL10 through IL 12. Each of the internal selectors IL10 through IL12 selects one of the twenty-five pixels of the input pixel data PD in response to the setting signal SS and outputs the selected one pixel as selected data ID10 through ID12, respectively. The internal selectors IL10 through IL12 are configured so that the internal selectors IL10 through IL12 select and output any one of the twenty-five pixels. The internal selectors IL10 through IL12 output the selected data ID10 through ID12, and the selected data ID10 through ID12 is input to the first filtering unit FF1. Here, the selected data ID10 through ID 12 assigned to the first filtering unit FF1 by the selector unit SL1 is defined as data belonging to a group GR1.

Note that structure of the selector units SL2 through SL8 is the same as structure of the selector unit SL1 and the descriptions thereof are omitted for the sake of brevity. The selector units SL2 through SL8 assign data belonging to groups GR2 through GR8 to the first filtering units FF2 to FF8, respectively. The selector unit SL8 includes four internal selectors IL80 through IL83 in response to each of the four inputs of the first filtering unit FF8 in a subsequent stage.

Figure 3:
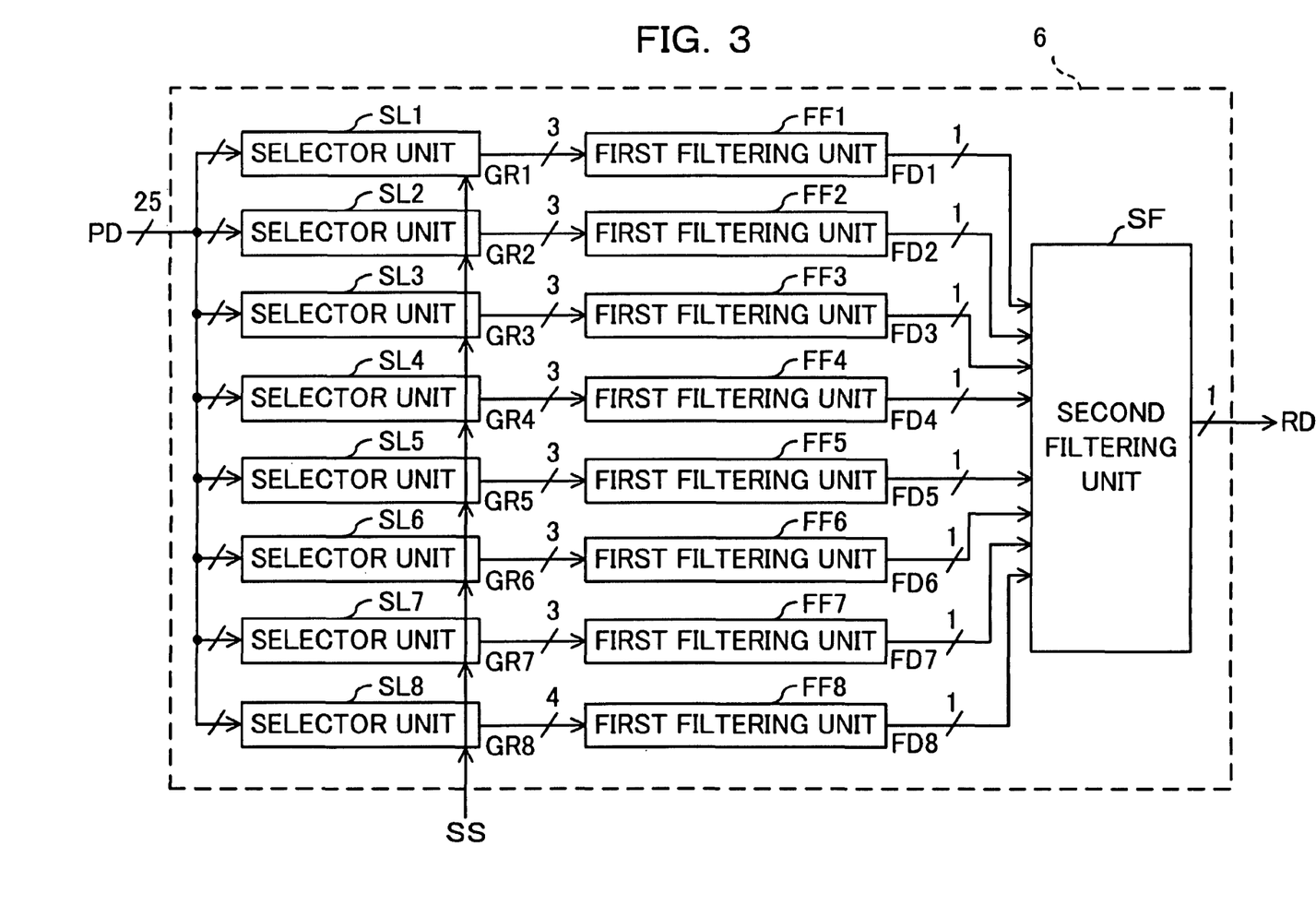
FIG. 3 shows a block diagram of a filtering circuit according to an example embodiment of the invention.

In FIG. 3, the selector units SL1 through SL8 output the pixel data belonging to the groups GR1 through GR8, respectively, and the pixel data belonging to the groups GR1 through GR8 is input to the first filtering units FF1 through FF8, respectively. The first filtering units FF1 through FF8 output filtered output data FD1 through FD8, respectively. A second filtering unit SF filters the filtered output data FD1 through FD8. The second filtering unit SF outputs finished pixel data RD, the processing of which is finished. The finished pixel data RD is input to the image processing circuit 7 as shown in FIG. 1.

The image processing circuit 7 receives the finished pixel data RD from the filtering circuit 6 and the pixel data PD from the delay line RAM 5. The pixel data PD (twenty-five pixels in total) is input to the flatness judging block 8 in the image processing circuit 7 and a coefficient A is output. Three types of data, i.e., the coefficient A, the finished pixel data RD and the target pixel P0 are input to the pixel synthesizing block 9 in the image processing circuit 7 and output pixel data OD is output. The output pixel data OD is input to the image processing unit 3, and the image processing unit 3 carries out a variety of image processing operations with the use of the output pixel data OD. Hereinafter, the above-described operation is sequentially carried out, that is, an area of the matrix MAT scans along the image data BD, which corresponds to the nine lines of the delay line RAM 5, so that the other pixels also serve as a target pixel in the first embodiment of the invention.

The image processing unit 3 carries out a variety of image processing operations with the use of the output pixel data OD sequentially input from the image pickup element circuit 2. With the processing operation, an image corresponding to one frame and produced by the camera 1 is created. Hereinafter, operations of the camera 1 according to the first embodiment of the invention will be described. The delay line RAM 5 extracts the pixel data PD from the matrix MAT. For example, the pixel data includes five by five pixels. Here, one example of an operation will be described. Continuous pixels that are the same color and are corrupted by impulsive noise (referred to herein as continuous impulsive noise pixels) may be aligned in a line in a longitudinal direction, as shown by a shaded area in FIG. 5. Five shaded pixels (i.e., pixels with coordinates (0,2), (0,1), (0,0), (0,−1) and (0,−2)) are shown on the matrix MAT in FIG. 5.

Hereinafter, an operation of the filtering circuit 6 will be described. The selector units SL1 through SL8 in the filtering circuit 6 assign the input pixel data PD (twenty-five pixels in total) to the groups GR1 through GR8 in response to the setting signal SS. This assignment operation, carried out by the selector units SL1 through SL8, is performed such that all of the plurality of pixels included in each group of the groups corresponding to GR1 through GR8 belongs to a different column on the matrix MAT in the form of two-dimensional array.

Figure 5:
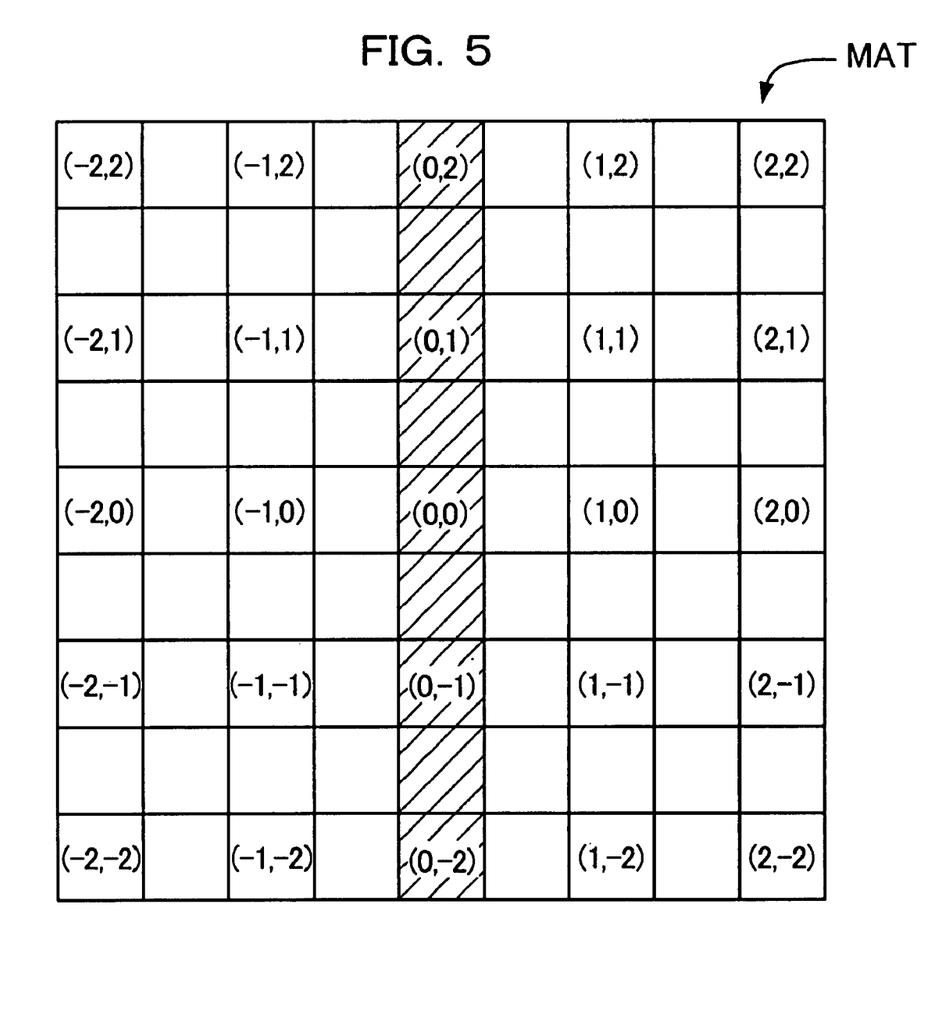
FIG. 5 shows a diagram of continuous noise pixels aligned in a line in a longitudinal direction according to an example embodiment of the invention.
Figure 6:
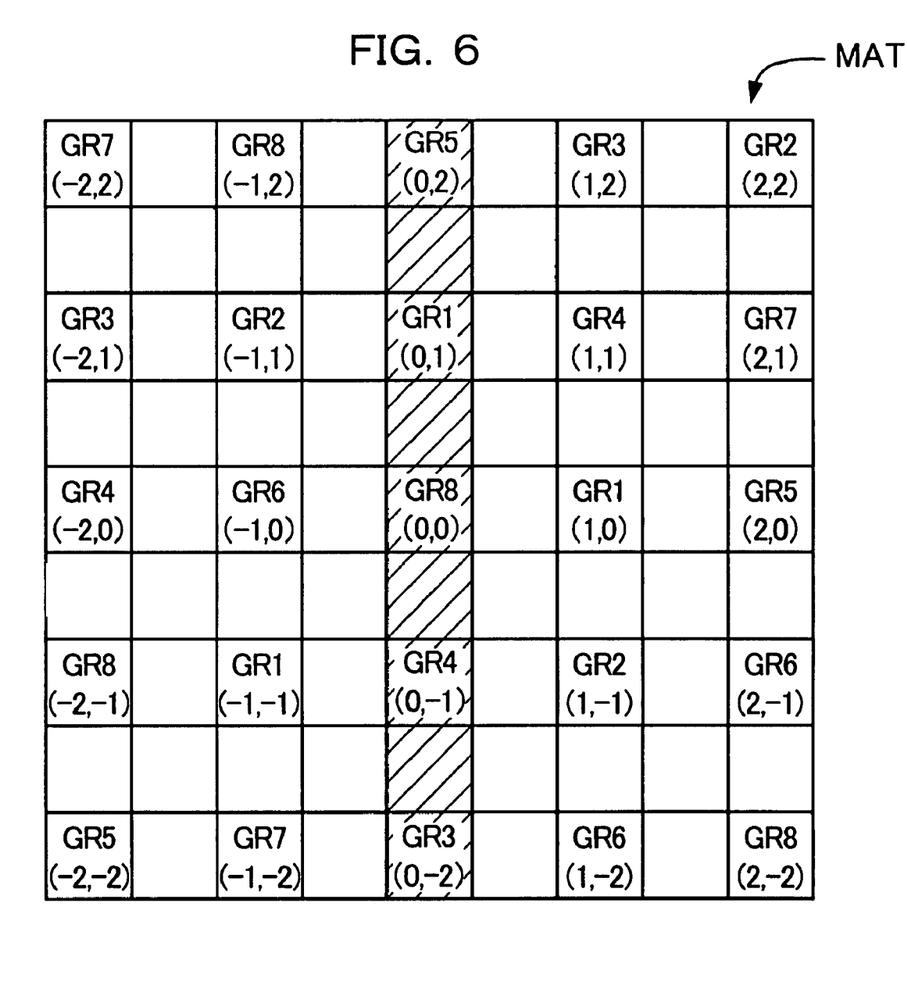
FIG. 6 shows a first example of the assignment of pixels of the matrix according to an example embodiment of the invention.

FIG. 6 shows one example of pixel assignment in which the twenty-five pixels on the matrix MAT are assigned to the groups GR1 through GR8 in response to the continuous impulsive noise pixels aligned in a line in the longitudinal direction in FIG. 5. To assign the pixels to the group GR1, the internal selector IL10 in the selector unit SL1 selects the pixel with coordinates (0,1) in response to the setting signal SS, the internal selector SL11 selects the pixel with coordinates (1,0), and the internal selector IL12 selects the pixel with coordinates (−1,−1). The three pixels (i.e., pixels with coordinates (0,1), (1,0) and (−1,−1)) belonging to the group GR1 are selected such that none of the three pixels belongs to the same column in the longitudinal direction (a vertical scanning direction) and the same row in the lateral direction (a horizontal scanning direction) on the matrix MAT.

Likewise, the selector unit SL2 assigns the pixels, i.e., pixels with coordinates (2,2), (−1,1) and (1,−1) to the group GR2. The selector unit SL3 assigns the pixels, i.e., pixels with coordinates (1,2), (−2,1) and (0,−2) to the group GR3. The selector unit SL4 assigns the pixels, i.e., pixels with coordinates (1,1), (−2,0) and (0,−1) to the group GR4. The selector unit SL5 assigns the pixels, i.e., pixels with coordinates (0,2), (2,0) and (−2,−2) to the group GR5. The selector unit SL6 assigns the pixels, i.e., pixels with coordinates (−1,0), (2,−1) and (1,−2) to the group GR6. The selector unit SL7 assigns the pixels, i.e., pixels with coordinates (−2,2), (2,1) and (−1,−2) to the group GR7. The selector unit SL8 assigns the pixels, i.e., pixels with coordinates (−1,2), (0,0), (−2,−1) and (2,−2) to the group GR8. The pixels belonging to each group is selected such that the pixels belonging to each group does not belong to the same vertical column and the same horizontal row on the matrix MAT.

In consequence, the twenty-five pixels to be filtered on the matrix MAT are assigned to groups GR1 through GR8. The groups include or consist of three or four pixels. A group of pixels belonging to respective groups GR1 through GR8 undergoes the filtering with the first filtering units FF1 through FF8. This allows the pixel data PD to be locally filtered (i.e., local filtering) with the use of each of the first filtering units FF1 through FF8.

The impulsive noise pixels included in the respective coordinates (0,2), (0,1), (0,0), (0,−1) and (0,−2) belong to groups GR5, GR1, GR8, GR4 and GR3, respectively. The above-described local filtering allows only a single pixel of impulsive noise to be included in each of the groups GR1 through GR8. Note that the groups GR1 through GR8 are the groups of pixels to be filtered.

Hereinafter, an operation of the first filtering units FF1 through FF8 in FIG. 3 will be described. The first filtering units FF1 through FF7 remove maximum and minimum values from the three pixels input as the groups GR1 through GR7 and output medians, thus obtained, as the filter output data FD1 through FD7. In addition, the first filtering unit FF8 removes maximum and minimum values from the pixels input as the group GR8 and outputs a mean value of the remaining two pixels, as the filter output data FD8. That is, the first filtering units FF1 through FF7 perform median filtering so as to output the medians.

The three pixels of the group GR1 are input to the first filtering unit FF1. One pixel of the above three pixels, i.e., pixel with coordinates (0,1) is the impulsive noise pixel. Since the impulsive noise is caused by a defective image pickup element or an image pick up operation with high-sensitivity, the impulsive noise usually takes a maximum or minimum value in the three pixels included in the group GR1. In other words, the impulsive noise does not take the median. Consequently, the impulsive noise pixels are completely removed from the filter output data FD1 as the median is output from the first filtering unit FF1. Likewise, the groups GR3, GR4, GR5 and GR8 including only a single pixel of impulsive noise are input to the first filtering units FF3, FF4, FF5 and FF8, respectively and then the filter output data FD3, FD4, FD5 and FD8 without the impulsive noise is output, respectively. Note that the impulsive noise is substantially or completely removed from filter output data FD3, FD4, FD5 and FD8.

Hereinafter, an operation of the second filter unit SF will be described. The second filter unit SF rearranges the filter output data FD1 through FD8 with reference to eight input pixels of the filter output data FD1 through FD8 and removes three pixels from maximum and minimum sides thereof. The second filtering unit SF takes a mean value of remaining two pixels to output the mean value, as the finished pixel data RD.

With the above operation, it is possible to remove the impulsive noise in the second filter unit SF even if the impulsive noise is not completely removed in a case where the continuous impulsive noise pixels with unexpected forms are input at the first filtering units FF1 through FF8. Thus, it is possible to remove the impulsive noise from the finished pixel data RD which is finally output from the second filtering unit SF.

Note that the filtering at the second filtering unit SF is not limited to the above-described median filtering. Since the first filtering units FF1 through FF8 have high capability in removing the impulsive noise, it often happens that the removal of the impulsive noise is not necessarily required at the second filtering unit SF since the first filtering unit units may completely remove the impulsive noise. For the above reason, a low pass filter or the like may be used for the second filtering unit SF.

Hereinafter, operations of the image processing circuit 7 in FIG. 1 will be described. The pixel data PD of twenty-five pixels in total is input to the flatness judging block 8 from the delay line RAM 5. Then the flatness judging block 8 performs a calculation of mean deviation on the input pixel data PD of twenty-five pixels. Since dispersion from an average is obtained by using the above mean deviation, unevenness of an image in a space of the matrix MAT is obtained.

The flatness judging block 8 acquires a maximum value in the pixel data PD (twenty-five pixels in total) and subsequently the flatness judging block 8 divides the mean deviation by the above maximum value, so that the mean deviation is normalized and a coefficient A is obtained. The coefficient A takes values between zero (0) and one (1). It is generally considered that the closer the value of the coefficient A is to one (1), the more the image includes edges. On the other hand, the closer the coefficient A is to zero (0), the less the image includes the edges. The coefficient A is input to the pixel synthesizing block 9.

Note that performing division by using bit shift in the flatness judging block 8 reduces and/or prevents an increase in circuit size. In addition, parameters calculated in the flatness judging block 8 is not limited to the mean deviation. Any parameter is usable as long as the parameter is used as means of obtaining the deviation from the average, i.e., standard deviation, variance or the like and as means of judging the unevenness of the image. However, it is noted the mean deviation may be obtained with hardware having a relatively small circuit size.

Hereinafter, an operation of the pixel synthesizing block 9 will be described. Three kinds of data, i.e., the coefficient A, the finished pixel data RD and the target pixel P0 are input to the pixel synthesizing block 9. The pixel synthesizing block 9 performs a calculation referred to as alpha (α) blending below. The alpha (α) blending is expressed by the following equation 1:

Output pixel data $OD$=Finished pixel data $RD$×(1.0−Coefficient $A$)+Target pixel $P0$×Coefficient $A$     [Equation 1]

From the above equation 1, it is understood that the closer the coefficient A is to zero (0), the more components of the finished pixel data RD are dominant in the output pixel data OD, and as a result, removal ratio of the noise becomes higher.

In addition, it is understood from the equation 1 that the closer the coefficient A is to one (1), the more components of the target pixel are dominant in the output pixel data OD, and as a result, the removal ratio of the noise becomes lower. The output pixel data OD output from the pixel synthesizing block 9 is input to the image processing unit 3.

An actual image taken by the image sensor 4 often includes an even area with little variation in signal intensity and an area including edges with large variation in the signal intensity. If the area including the edges is strongly filtered, this strong filtering causes the edges of the image to be blurred. The edges of the image being blurred results in an image without a sense of high resolution. The "sense of high resolution" means an impression of satisfactory resolution when the image is visually detected by human eyes. To avoid the image without the sense of high resolution, the alpha ($\alpha$) blending is carried out with the image processing circuit 7. This allows the pixel data before noise removal to be stored as much as possible in the area including the edges, by reducing strength of the filtering. On the other hand, when the even area is filtered, the noise is removed by strongly filtering the even area. Consequently, the image with noise removed and with less blurred edges is achieved, so that the image having the sense of high resolution is obtained.

As described above with respect to the first embodiment of the invention, the selector units SL1 through SL8 select a plurality of pixels belonging to the groups GR1 through GR8 from the pixel data PD including the plurality of pixels forming the image. The respective first filtering units FF1 through FF8 perform the filtering of the plurality of pixels belonging to the group GR1 through GR8. With the above operations, the respective first filtering units FF1 through FF8 perform the local filtering of pixel data PD.

When the respective selector units SL1 through SL8 select the plurality of pixels belonging to respective groups GR1 through GR8, the selector units SL1 through SL8 select the pixels such that none of the pixels belongs to the same column on the matrix MAT in the form of two-dimensional array. The above operations allow only a single noise pixel to be included in each of the groups GR1 through GR8. In other words, no more than one of the continuous noise pixels belonging to the same column in the two-dimensional array is included in a group of the groups GR1 through GR8. With the above-described operation, not only the ratio of the noise pixels included in the Groups GR1 through GR8 is reduced but also the noise pixels are removed. Consequently, it may be possible to reduce a negative influence of the noise on the finished pixel data RD.

According to the camera 1 in the first embodiment of the invention, the pixel data PD, of twenty-five pixels in total, is assigned to each of the groups GR1 through GR8 in units of three (3) or four (4) pixels and the first filtering units FF1 through FF8 carry out the median filtering of a first stage. Subsequently, the second filtering unit SF performs the median filtering of a second stage on the filter output data FD1 through FD8 (eight pixels in total), which is output from the first filtering units FF1 through FF8, so that the finished pixel data RD is obtained.

Note that the higher the number of the pixels to be filtered, the stronger the median filtering effect becomes. On the other hand, the median filtering requires sorting to arrange the pixel data with reference to pixel values of the pixel data. When the sorting is carried out by using hardware, the hardware may require a circuit for determining maximum and minimum values with a round robin system, which may exponentially increase the size of the circuit if an increased number of pixels is to be filtered. However, if the median filtering is carried out in two separate stages as described in the first embodiment of the invention, the circuit size may be reduced. On the other hand, this also allows an increase in the number of pixels to be filtered and much stronger median filtering is achieved.

Figure 7:
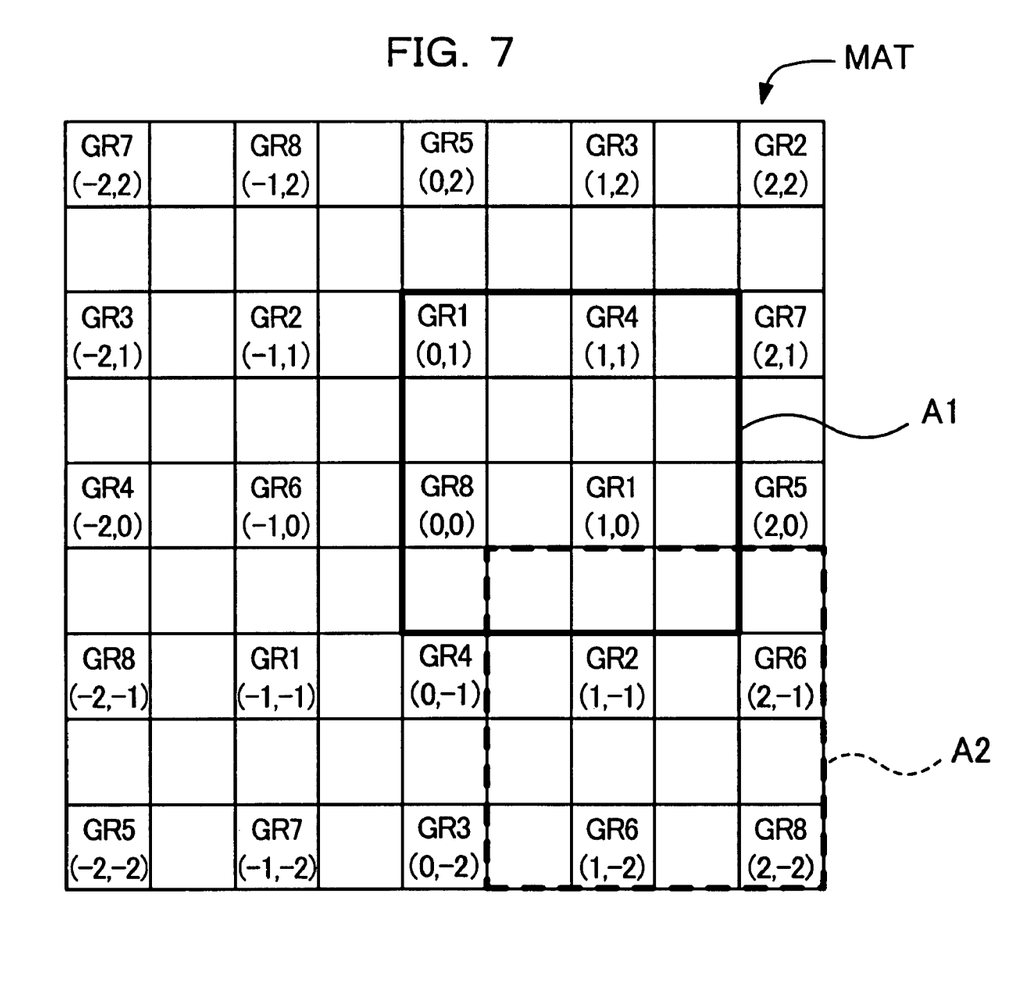
FIG. 7 shows a diagram of a block of four by four noise pixels according to an example embodiment of the invention.
Figure 8:
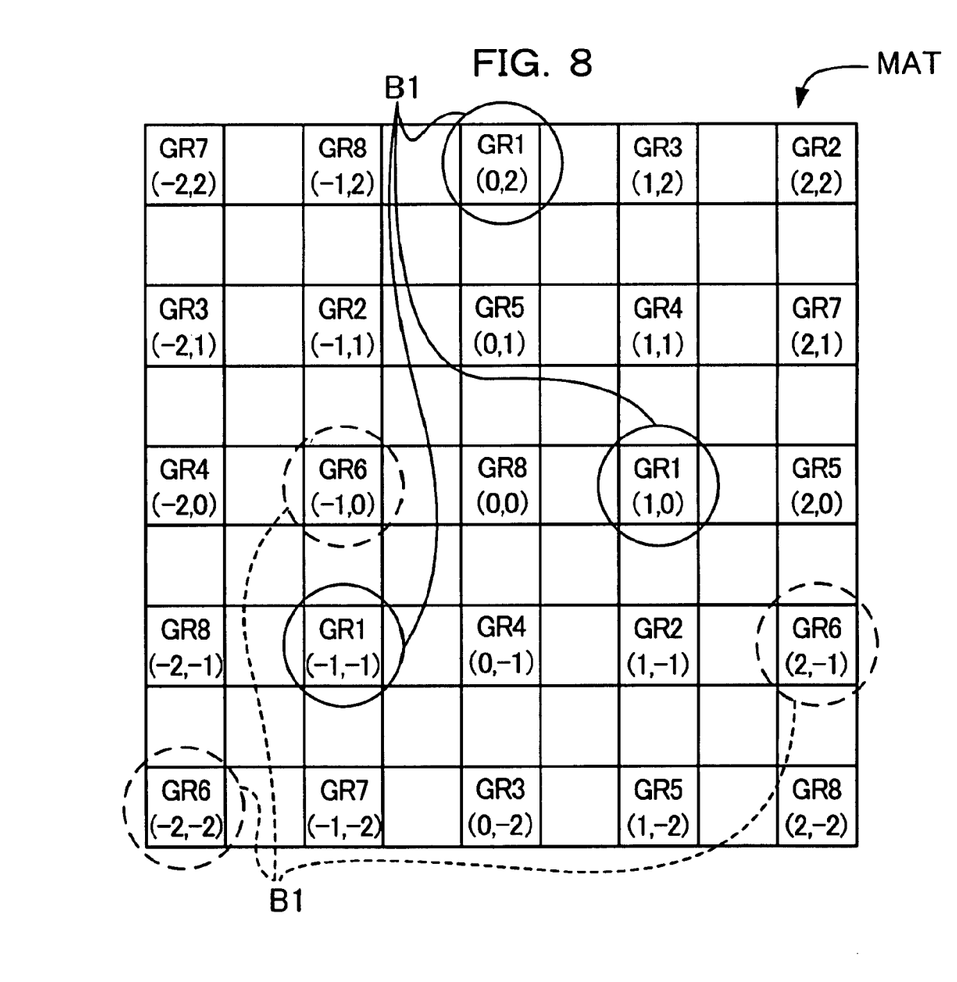
FIG. 8 shows a second example of the assignment of pixels of the matrix according to another example embodiment of the invention.

Hereinafter, a second embodiment of the invention will be described with reference to FIGS. 7 and 8. In the second embodiment of the invention, a method of assigning the pixels to the groups GR1 through GR8 will be described, i.e., a case where it is possible to assume forms of continuous noise pixels and/or a case where it is possible to identify positions of the continuous noise pixels. An example will be described in which a block of four-by-four pixels corrupted by impulsive noise appears. In FIG. 7, the block of four-by-four impulsive noise pixels is shown as areas as A1 or A2. A1 is enclosed by the bold line, and A2 is enclosed by the dotted line in FIG. 7. It is possible to suppose the forms of the continuous noise pixels appearing on the image picked up by the image sensor 4, or it is possible to assume the positions of the continuous noise pixels with shipping inspections. The shipping inspections allow existence or distribution of the defective pixels to be detected in advance.

The same components used in the image pickup circuit 2 described with respect to FIG. 1 may be used to perform operations described below with respect to FIGS. 7 and 8, and thus the description of these components is omitted herein for the sake of brevity.

First, a case shown below will be described, i.e., the block of four-by-four noise pixels appear when the method of assigning the pixels shown in FIG. 6 in the first embodiment of the invention is performed. As shown in FIG. 7, when the block of four-by-four noise pixels appears on an area A1 enclosed by the bold line, the group GR1 includes two noise pixels, i.e., pixels with coordinates (0,1) and (1,0). This is because the pixels with coordinates (0,1) and (1,0) assigned to the group GR1 are separated by only three pixels in a longitudinal direction and a lateral direction on the matrix MAT.

When the block of four-by-four noise pixels appears on an area A2 enclosed by the dotted line in FIG. 7, the group GR6 includes two noise pixels, e.g., pixels with coordinates (2,−1) and (1,−2). This is because the pixels with coordinates (2,−1) and (1,−2) assigned to the group GR6 are separated by only three pixels in the longitudinal direction and the lateral direction on the matrix MAT. Since more than one noise pixels are included in the groups GR1 and GR6 it is difficult to remove the noise pixels with the use of median filtering.

Hereinafter, a method of assigning the pixels which correspond to a block of four-by-four noise pixels in FIG. 8 to the respective groups will be described. To change the assignment of the pixels to the respective groups, it may be necessary to change the setting signal SS output from the register 10. According to the method of assigning the pixels to the respective groups shown in FIG. 8, a plurality of pixels each belonging to group GR1 indicated by area B1, i.e., pixels with coordinates (0,2), (1,0) and (−1,−1), are separated by five or more pixels in a longitudinal direction, a lateral direction and an oblique direction, to one another. As indicated by an area B2, a plurality of pixels each belonging to the group GR6, i.e., pixels with coordinates (−1,0), (2,−1) and (−2,−2), are separated from one another by five or more pixels in the longitudinal direction, the lateral direction and the oblique directions. In the other groups, a plurality of pixels each belonging to the individual group are separated from one another by five or more pixels in the longitudinal, lateral and oblique directions.

As shown in the above cases, it is possible to avoid the plurality of noise pixels from being assigned to the individual group by determining the method of assigning the pixels in response to probable forms of the continuous impulsive noise, such as the block of four-by-four noise pixels, for example.

As described in detail, according to the camera 1 in the second embodiment of the invention, it is possible to avoid the plurality of impulsive noise pixels from being assigned to the individual group, by determining the method of assigning the pixels in response to the probable forms of the continuous impulsive noise, such as the block of four-by-four noise pixels, for example. This allows the first filtering units FF1 through FF8 to effectively remove the impulsive noise.

Note that the invention is not limited to the details of the example embodiments described above, but various modifications and improvements are possible without departing from the spirit and scope of the invention.

Features of the embodiments of the invention reside in that the first filtering units FF1 through FF8 carry out the local filtering of the pixel data PD, so that the ratio of the noise pixel included in the group of pixels filtered by the individual filter unit is reduced. One skilled in the art will appreciate that the filtering carried out by the first filtering units FF1 through FF8 and the filtering carried out by the second filtering unit SF are not limited to the median filtering. It is also possible to use a variety of filtering operations such as a low-pass filtering, a median filtering or the like. One skilled in the art will also appreciate that the noise pixels are not limited to the impulsive noise and that the example embodiments of the invention are also applicable to Gaussian distribution noise.

In the second embodiment of the invention, although the assigning operation with the selector units SL1 through SL8 are carried out so that all of the plurality of pixels included in the individual group belong to the different column on the matrix MAT in the form of the two-dimensional array, the embodiment of the invention is not limited thereto. It is also possible to use another operation in which the assigning operation is carried out such that none of the plurality of pixels included in the individual group belongs to the same column on the matrix MAT in the form of the two-dimensional array. The assigning operation as described above may also achieve the same advantage, i.e., not more than one noise pixel is included in each of the groups GR1 through GR8.

It is possible that each of the selector units SL1 through SL8 assigns the pixels which are not adjacent to one another in the twenty-five pixels on the matrix MAT to be filtered, to each of the groups GR1 through GR8. With the above operation, it is possible to reduce the ratio of the noise pixels in the group of pixels that undergoes the individual filtering unit, even if the noise pixels form a block including the plurality of noise pixels and arranged in the longitudinal and lateral directions, as well as the noise pixels aligned in a line in the longitudinal direction. In addition, it is also possible to reduce a negative influence caused by the noise pixels on the image.

Figure 9:
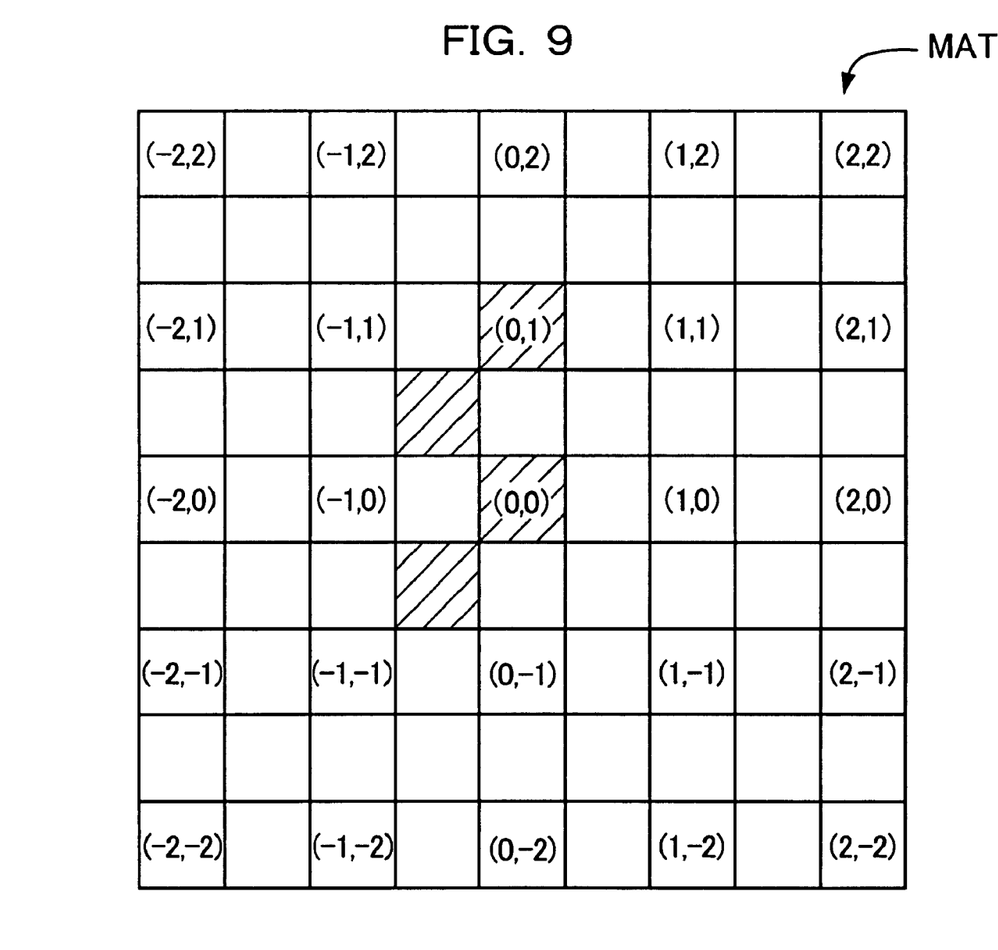
FIG. 9 shows four continuous noise pixels defectively arranged, and having a zigzag shape according to an example embodiment of the invention.

As shown in FIG. 5, although the an embodiment of the invention discloses that the impulsive noise pixels are longitudinally aligned in a line on the matrix MAT, the embodiment of the invention is not limited thereto. The noise is capable of being removed by using the grouping shown in FIG. 6 according to the first embodiment of the invention, even if the noise pixels are arranged in a defective configuration having a zigzag form as shown in FIG. 9, or the noise pixels are laterally aligned in a line.

According to the second embodiment of the invention, although the second embodiment of the invention discloses that the method of reducing the noise by extracting the pixel data PD of twenty-five pixels from the matrix MAT, the application is not limited thereto. It is possible to increase the number of pixel data PD used for reducing the noise by increasing the number of filtering units FF1 through FF8 without an increase in circuit size. It is also possible to achieve stronger noise reduction by increasing number of pixels used as the pixel data PD.

In addition, although the second embodiment of the invention discloses that the number of pixels assigned to the first filtering units FF1 through FF8 is three or four, the embodiment is not limited thereto. One skilled in the art will appreciate that the number of pixels greater than the aforementioned number is also possible if it is feasible to incorporate the number of pixels greater than the aforementioned number in the circuit for determining the maximum and minimum values in the first filtering units. For example, if each first filtering unit is configured such that the five pixels are capable of being input, it is possible to perform the median filtering by removing two pixels having the largest and the second largest values and two pixels having the smallest and second smallest values from the above five pixels after sorting with each of the first filtering units.

Although the second embodiment of the invention discloses that the filtering circuit 6 includes the plurality of first filtering units FF1 through FF8, the embodiment is not limited thereto. In other words, the embodiment is not limited to cases in which the plurality of first filtering units are physically provided. A single first filtering unit is used alternately in a time division manner, so that the filtering circuit 6 includes the single first filtering unit which functions virtually as the plurality of the first filtering units with the use of the time division manner.

Although the second embodiment of the invention discloses that the selector units SL 1 through SL8 assign the pixel data PD to the first filtering units FF1 through FF8, the embodiment is not limited thereto. It may be possible that the filtering circuit 6 is not equipped with the selector units SL1 through SL8 and the pixel data of twenty-five pixels input in parallel to the filtering circuit 6 is assigned to the first filtering units FF1 through FF8 via wiring.

Although the first embodiment of the invention discloses that the alpha ($\alpha$) blending is performed in the image processing circuit 7, the embodiment is not limited thereto, i.e., it is not indispensable that the image processing circuit 7 performs the alpha ($\alpha$) blending. Instead, other image processing operations including a white balance adjustment or the like may be also possible.

Although the first and second embodiment of the invention disclose that the filtering circuit 6 is capable of being used as the image pickup element circuit 2 or the camera 1, the embodiments are not limited thereto. The filtering circuit 6 is capable of being used for a variety of circuits, devices, apparatuses, equipment and so on if such circuits, devices, apparatuses, equipment and so on are capable of processing the images.

Although the first and second embodiments mention the processing of image data BD of the Bayer array, the present application is not limited thereto. The same advantages may be obtained with the other arrays.

The image sensor 4 is an example of an image pickup element. The first filtering units FF1 through FF8 are an example of filtering unit. The selector units SL1 through SL8 are an example of selecting unit. The filter output data FD1 through FD8 is an example of filter output. The flatness judging block 8 is an example of flatness judging unit and the pixels synthesis block 9 is an example of synthesizing unit, respectively.

Many features and advantages of the embodiments of the invention are apparent from the detailed specification and, thus, it is intended by the appended claims to cover all such features and advantages of the embodiments that fall within the true spirit and scope thereof. Further, because numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A filtering circuit which filters an image picked up by an image pickup element arranged in a two dimensional array, the filtering circuit comprising:
   a plurality of filtering units to locally filter a plurality of pixels forming the image; and
   a selecting unit to perform selection such that all of a plurality of pixels filtered by one of the plurality of filtering units belong to a different column of the two dimensional array.

2. The filtering circuit according to claim 1, wherein the selecting unit selects at least one pixel to be filtered by one of the filtering units and selecting another pixel to be filtered by another one of filtering units, the at least one pixel and the another pixel belonging to a same column of the two dimensional array.

3. The filtering circuit according to claim 1, wherein the selecting unit selects non-adjacent pixels of the two dimensional array to be filtered by the one of the filtering units.

4. The filtering circuit according to claim 1, wherein the selecting unit performs selection such that the plurality of pixels having a probability of being affected by noise are filtered by different filtering units.

5. The filtering circuit according to claim 1, wherein the selection performed by the selecting unit is variable based on a setting.

6. A filtering circuit which filters an image picked UP by an image pickup element arranged in a two dimensional array, the filtering circuit comprising:
   a plurality of filtering units to locally filter a plurality of pixels forming the image; and
   a selecting unit to select at least one pixel to be filtered by one of the filtering units and selecting another pixel to be filtered by another one of filtering units, the at least one pixel and the another pixel belonging to a same column of the two dimensional array,
   wherein the plurality of pixels selected by the selecting unit have pixel values, and the filtering unit performs filtering with a pixel value obtained by excluding a maximum value and a minimum value from the pixel values of the plurality of pixels to be filtered.

7. The filtering circuit according to claim 6, wherein a mean value of the plurality of pixel values other than the maximum value and the minimum values is calculated through the filtering.

8. The filtering circuit according to claim 6, wherein a median value of the plurality of pixel values other than the maximum value and the minimum value is calculated through the filtering.

9. The filtering circuit according to claim 6, wherein a plurality of filter outputs from the plurality of filtering units are filtered by excluding a maximum value and a minimum value of a plurality of filter outputs.

10. The filtering circuit according to claim 6, wherein a plurality of filter outputs from the plurality of filtering units are filtered such that a mean value is further calculated.

11. A method of filtering an image picked up by an image pickup element arranged in a two dimensional array, the method comprising:
   selecting such that all of a plurality of pixels filtered by one of the plurality of filtering units belong to a different column of the two dimensional array; and
   filtering the selected all of a plurality of pixels using the first filtering unit.

12. The method of claim 11, further comprising:
   selecting another pixel; and
   filtering the selected another pixel using the second filtering unit.

13. The method of claim 11, wherein the selecting selects a plurality of pixels and the plurality of pixels are in different rows of the two-dimensional array.

14. An image pickup element circuit comprising:
   an image sensor arranged in a two dimensional array; and
   a filtering circuit to remove noise from an image output from the image sensor,
   wherein the filtering circuit includes a plurality of filtering units to locally filter a plurality of pixels forming the image, and a selecting unit to perform selection such that all of a plurality of pixels filtered by one of the plurality of filtering units belong to a different column of the two dimensional array.

15. An image pickup element circuit comprising:
   an image sensor arranged in a two dimensional array; and
   a filtering circuit to remove noise from an image output from the image sensor,
   wherein the filtering circuit includes a plurality of filtering units to locally filter a plurality of pixels forming the image, and a selecting unit to select at least one pixel to be filtered by one of the filtering units and selecting another pixel to be filtered by another one of filtering units, the at least one pixel and the another pixel belonging to a same column in the two dimensional array; and
   an image processing circuit to receive filtered data from the filtering circuit,
   wherein the image processing circuit includes a flatness judging unit to obtain flatness indicating dispersion of a plurality of pixels forming the image, and a synthesizing unit to synthesize, in response to the flatness, a noise-removed pixel output from the filtering circuit and a target pixel in the plurality of pixels forming the image.

16. The image pickup element circuit according to claim 15, wherein the synthesizing unit increases a synthesis ratio of the plurality of pixels forming the image, in response to an increase in the dispersion among the plurality of pixels forming the image, and increases synthesis ratio of the noise-removed pixel, in response to a decrease in the dispersion among the plurality of pixels forming the image.

17. A camera comprising:
   an image sensor arranged in a two dimensional array;
   an image processing filter to remove noise from an image output from the image sensor; and
   an image processing circuit to signal-process the image from which the noise is removed,
   wherein the image processing filter includes a plurality of filtering units to locally filter a plurality of pixels forming the image, and a selecting unit to perform selection such that all of a plurality of pixels filtered by one of the plurality of filtering units belong to a different column of the two dimensional array.

* * * * *

UNITED STATES PATENT AND TRADEMARK OFFICE
CERTIFICATE OF CORRECTION

PATENT NO. : 8,218,891 B2
APPLICATION NO. : 12/234662
DATED : July 10, 2012
INVENTOR(S) : Takeshi Seki et al.

It is certified that error appears in the above-identified patent and that said Letters Patent is hereby corrected as shown below:

Title page in Section (75) Inventors: Yuri Watarai should read -- Yuji Watarai --.

Signed and Sealed this
Twenty-eighth Day of August, 2012

David J. Kappos
*Director of the United States Patent and Trademark Office*